No. 827,361. PATENTED JULY 31, 1906.
W. K. GIBBONEY.
INSULATING SUPPORT FOR ELECTRICAL CONDUCTORS.
APPLICATION FILED JULY 28, 1905.
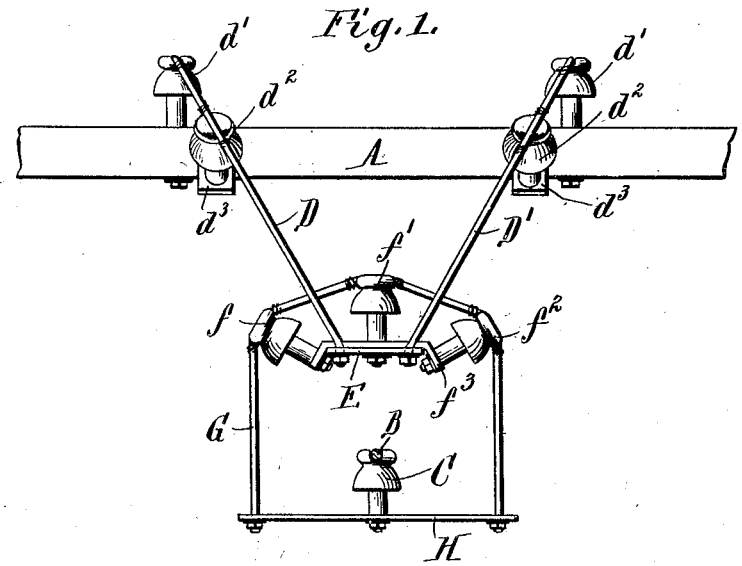
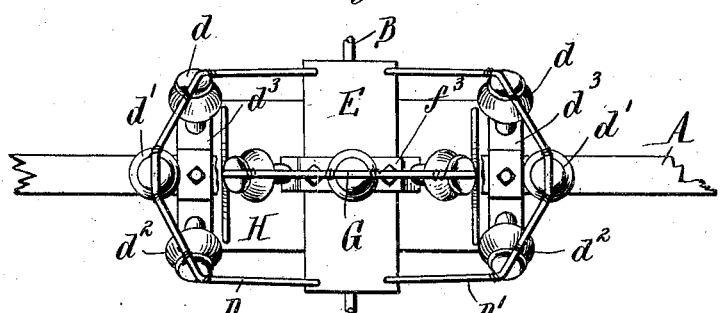
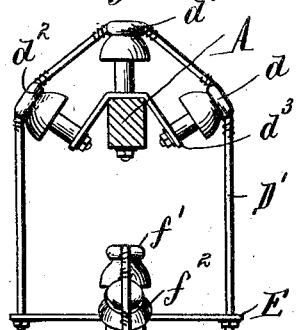
Witnesses:—
R. W. Kunser.
J. F. Webster.
Inventor,
W. K. Gibboney
by Wilhelm, Parker Hard
Attorneys.

UNITED STATES PATENT OFFICE.

WILLIAM K. GIBBONEY, OF BUFFALO, NEW YORK.

INSULATING-SUPPORT FOR ELECTRICAL CONDUCTORS.

No. 827,361.  Specification of Letters Patent.  Patented July 31, 1906.

Application filed July 28, 1905. Serial No. 271,579.

*To all whom it may concern:*

Be it known that I, WILLIAM K. GIBBONEY, a citizen of the United States, residing at Buffalo, in the county of Erie and State of New York, have invented a new and useful Improvement in Insulating-Supports for Electrical Conductors, of which the following is a specification.

This invention relates more particularly to insulating supports or structures for high-potential electrical conductors.

The primary object of the invention is to provide an insulating-support of simple and economical construction which combines great mechanical strength and stability with the maximum insulating effect.

Other objects of the invention are to so construct the insulating-support that small insulators of ordinary construction, which can be manufactured at little expense, can be used and will insure more perfect insulation and protection than the more expensive large insulators commonly employed; to so dispose the suspension members of the support and the insulators that the former will be subject to tension strains only and the latter to compression stresses only; to construct the support so as to prevent the falling of the conductor or the short-circuiting of its current in the event of the breaking of one or more of the insulators, and to improve insulating-supports for electrical conductors in the respects hereinafter specified, and set forth in the claims.

In the accompanying drawings, Figure 1 is a side elevation of an insulating-support embodying the invention. Fig. 2 is a plan view thereof, the main support being partly broken away to show the lower portions of the device. Fig. 3 is an end elevation thereof.

Like letters of reference refer to like parts in the several figures.

A represents a main support, which may be the cross-arm of a pole or any other suitable stationary supporting member. The electrical conductor B is secured to a main insulator C, which is suspended beneath the main support by an insulating support or structure comprising suspension devices or members— such as rods, wires, cables, or the like—and supporting-insulators on which these devices or members are hung.

The insulating-support shown in the drawings is constructed as follows: D D' represent suspension members or devices consisting, preferably, of looped or bent rods, wires, or cables, each of which straddles the main support A and is hung on supporting-insulators $d$ $d'$ $d^2$, rigidly secured in any suitable manner to the main support. The central supporting-insulator $d'$ for each suspension member is secured directly to and extends perpendicularly up from the main support A, while the two side insulators $d$ $d^2$ are secured to the downwardly-extending arms of a cross-bar $d^3$, fixed to the main support, from which arms they extend upwardly and incline outwardly or away from said main support, as best shown in Fig. 3. The legs of the two suspension members converge toward each other and are connected at their lower ends by and support a base or shelf E, which may consist of a metal plate, as shown, or may be formed by any other suitable member or structure. A suspension member G, which is preferably similar to the other suspension members D D' and consists of a looped or bent rod, wire, or cable, straddles the base E and is hung on three insulators $f$ $f'$ $f^2$, secured in any suitable manner to said base E. The middle insulator $f'$ stands upright and is secured directly to the central portion of the base E, while the two side insulators $f$ $f^2$ extend upwardly and incline outwardly from the base, being preferably secured to the downwardly-inclined ends of a cross-bar $f^3$, secured to said base. The legs of the suspension member G depend vertically from said side insulators and are connected at their lower ends by and support a second base or shelf H, in the center of which, between the legs of the suspension member G, is secured, in the usual or any suitable manner, the main insulator C, to which the electrical conductor B is secured. The lower base H shown consists of a metal plate, and the legs of the suspension member are branched and secured to the corners of this plate to hold the same horizontal; but this construction is not essential, and the base may be made of any other suitable member or structure, and the form of the suspension member could also be different.

The main insulator C and also the other insulators for the suspension members are preferably of the ordinary skirted type, made of porcelain or other suitable insulating material, and have grooves or seats in their heads in which the conductor B and suspension members rest and are secured by ordinary tie-wires.

The relative arrangement and direction of the several supporting-insulators for each suspension device or member are such that each insulator is subject only to compression stresses in the direction of its longitudinal axis, as will be readily apparent from an examination of the drawings, and as the insulators can withstand an enormous crushing strain the liability of breaking them is reduced to the minimum. The suspension members, on the other hand, are all placed in tension, and comparatively light flexible rods or wires or even cables will produce a very strong support. The diverging upper suspension members D D' hold the support from swaying sidewise, and when the conductor B is attached to the insulating-supports it is held very rigidly. As the main insulator is connected with the main support by a series of suspension members, each insulated from the other, the insulation of the conductor is very complete. In the event of the conductor becoming detached from the main insulator or the latter breaking the conductor could only lodge on the lower base or suspension member G, and as these are thoroughly insulated from the upper base and main support no harm can be done. Likewise the breaking of one or more of the supporting-insulators for the suspension members could not cause the contact of the conductor with an uninsulated part.

In the insulating-support shown in the drawings the main insulator is carried by one suspension device, which in turn is carried by another suspension device; but manifestly the number of the suspension devices employed between the main support and the main insulator could be increased or diminished without departing from the scope of the invention.

I claim as my invention—

1. The combination of a plurality of supporting-insulators, a flexible suspension device bearing on and supported by said insulators, and an insulator supported by said suspension device, said supporting-insulators being arranged with their axes substantially in the directions of the resultants of the forces acting thereon, whereby the insulators are subject only to compression stresses in the directions of their axes, substantially as set forth.

2. The combination of a main support, supporting-insulators projecting upwardly from said main support, a suspension device bearing centrally on and supported by said insulators, and an insulator for a conductor supported by said suspension device below said main support, substantially as set forth.

3. The combination of a main support, a suspension device straddling and supported by said main support and insulated therefrom, and an insulator for a conductor supported by said suspension device below said main support, substantially as set forth.

4. The combination of a group of supporting-insulators, a looped or bent suspension device straddling said insulators and supported thereby with legs depending at opposite sides of said group of insulators, and an insulator for a conductor supported from the depending legs of said suspension member, substantially as set forth.

5. The combination of a group of supporting-insulators, a suspension device supported on said insulators and having opposite ends depending from said group of insulators at opposite sides thereof and connected, and an insulator for a conductor supported from the connected depending ends of said suspension device, substantially as set forth.

6. The combination of a central upright insulator and insulators on opposite sides thereof which diverge upwardly, a suspension device supported on said insulators and depending therefrom, and an insulator supported from the depending portions of said suspension device, substantially as set forth.

7. The combination of a support, central and side insulators secured to said support, a suspension device straddling said support and supported by said insulators, and an insulator supported by said suspension device below said support, substantially as set forth.

8. The combination of a main support, insulators secured to and extending upwardly from said main support, suspension members supported by said insulators, a base connecting and supported by said suspension members below said main support, and an insulator supported from said base, substantially as set forth.

9. The combination of a main support, insulators secured thereto, suspension members supported by said insulators, a base connecting and supported by said suspension members below said main support, insulators secured to said base, a suspension member supported by and depending from said last-mentioned insulators, and an insulator for a conductor carried by said last-mentioned suspension member, substantially as set forth.

10. The combination of a main support, two suspension members straddling said support, three insulators secured to said support and supporting each of said suspension members, said suspension members converging toward their lower ends, and an insulator supported by said suspension members, substantially as set forth.

Witness my hand this 12th day of July, 1905.

WILLIAM K. GIBBONEY.

Witnesses:
EDWARD C. HARD,
A. L. MCGEE.